United States Patent
Murata

(10) Patent No.: US 9,858,118 B2
(45) Date of Patent: Jan. 2, 2018

(54) INFORMATION PROCESSING DEVICE AND INFORMATION PROCESSING METHOD TO PRESENT TASKS

(71) Applicant: Jun Murata, Tokyo (JP)

(72) Inventor: Jun Murata, Tokyo (JP)

(73) Assignee: Ricoh Company, Limited, Tokyo (JP)

(*) Notice: Subject to any disclaimer, the term of this patent is extended or adjusted under 35 U.S.C. 154(b) by 8 days.

(21) Appl. No.: 14/853,185

(22) Filed: Sep. 14, 2015

(65) Prior Publication Data

US 2016/0077875 A1     Mar. 17, 2016

(30) Foreign Application Priority Data

Sep. 17, 2014  (JP) .................. 2014-188771

(51) Int. Cl.
  G06F 9/46   (2006.01)
  G06F 9/48   (2006.01)
  G06F 9/54   (2006.01)

(52) U.S. Cl.
  CPC ............ *G06F 9/4887* (2013.01); *G06F 9/542* (2013.01)

(58) Field of Classification Search
  None
  See application file for complete search history.

(56) References Cited

U.S. PATENT DOCUMENTS

| | | | | |
|---|---|---|---|---|
| 8,539,514 B2* | 9/2013 | Makam | ................... | G06Q 10/10 705/7.27 |
| 8,893,140 B2* | 11/2014 | Meyer | ................... | G06F 9/4881 718/103 |
| 2009/0007101 A1* | 1/2009 | Azar | ..................... | G06F 9/4881 718/1 |
| 2009/0241117 A1* | 9/2009 | Dasgupta | .............. | G06F 9/5038 718/101 |
| 2013/0263142 A1* | 10/2013 | Miyamae | .............. | G06F 9/5033 718/102 |
| 2014/0333528 A1 | 11/2014 | Murata | | |
| 2015/0054968 A1 | 2/2015 | Murata | | |

FOREIGN PATENT DOCUMENTS

| | | |
|---|---|---|
| JP | 2002-007670 | 1/2002 |
| JP | 2003-345966 | 12/2003 |
| JP | 2006-092335 | 4/2006 |
| JP | 2006-092336 | 4/2006 |
| JP | 2006-092338 | 4/2006 |
| JP | 2006-092369 | 4/2006 |
| JP | 4492276 | 4/2010 |
| JP | 2013-088829 | 5/2013 |

* cited by examiner

*Primary Examiner* — Gregory A Kessler
(74) *Attorney, Agent, or Firm* — Harness, Dickey & Pierce, P.L.C.

(57) ABSTRACT

An information processing device includes an event detector, a task generator, a target time setting unit, and a presenting unit. The event detector detects occurrence of an event. The task generator generates at least one task indicating an action to be executed when the detected event occurs. The target time setting unit sets, for each of the tasks corresponding to the detected event, a target completion time of the task until when a state change generated due to occurrence of the event does not exceed a threshold, on the basis of an execution result of tasks corresponding to a past event related to the detected event. The presenting unit presents each of the tasks corresponding to the detected event and the target completion time of each of the tasks to a user.

13 Claims, 7 Drawing Sheets

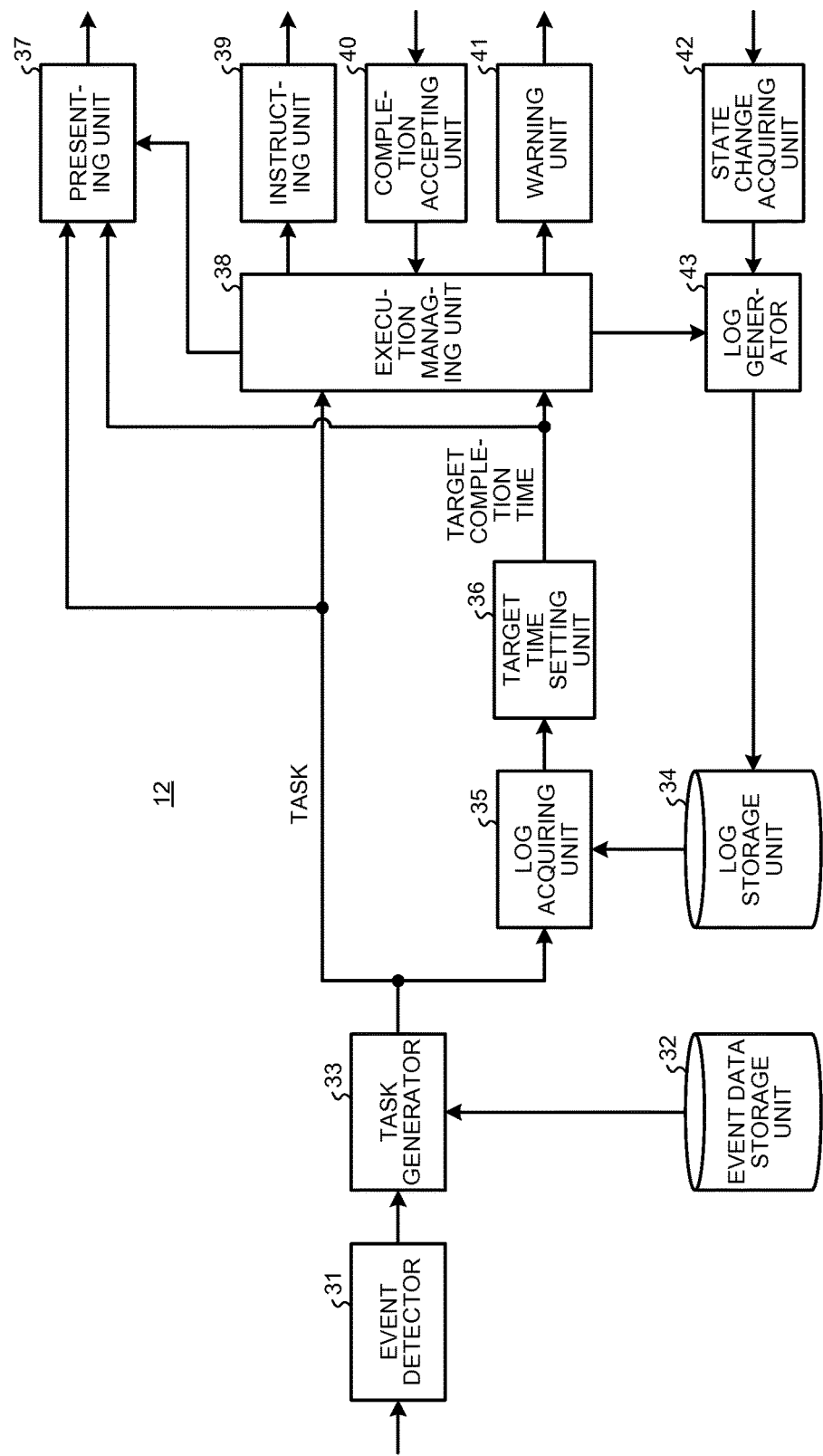

FIG.3

| EVENT | TASK |
|---|---|
| INTERRUPTION IN OPERATION OF TRANSPORT FACILITIES | ·NOTIFICATION OF INITIAL REPORT<br>·NOTIFICATION OF ALTERNATIVE ROUTE<br>·NOTIFICATION OF DETAILS<br>·NOTIFICATION OF RESTART SCHEDULE<br>·NOTIFICATION OF RESTART |
| DELAY IN TRANSPORT FACILITIES OF OTHER COMPANIES | ·————————<br>·————————<br>·————————<br>·———————— |
| ⋮ | ⋮ |

FIG.4

| EVENT | OCCURRENCE TIME | TASK | COMPLETION PERIOD | STATE CHANGE INFORMATION AT COMPLETION |
|---|---|---|---|---|
| INTERRUPTION IN OPERATION OF TRANSPORT FACILITIES | [MONTH] XX [DATE] XX [TIME] XX:XX | NOTIFICATION OF INITIAL REPORT<br>NOTIFICATION OF ALTERNATIVE ROUTE<br>NOTIFICATION OF DETAILS<br>NOTIFICATION OF RESTART SCHEDULE<br>NOTIFICATION OF RESTART | XX HOUR(S) XX MINUTE(S)<br>XX HOUR(S) XX MINUTE(S)<br>XX HOUR(S) XX MINUTE(S)<br>XX HOUR(S) XX MINUTE(S)<br>XX HOUR(S) XX MINUTE(S) | XX CASE(S)<br>XX CASE(S)<br>XX CASE(S)<br>XX CASE(S)<br>XX CASE(S) |
| ⋮ | ⋮ | ⋮ | ⋮ | ⋮ |

INFORMATION PROCESSING DEVICE AND INFORMATION PROCESSING METHOD TO PRESENT TASKS

CROSS-REFERENCE TO RELATED APPLICATIONS

The present application claims priority to and incorporates by reference the entire contents of Japanese Patent Application No. 2014-188771 filed in Japan on Sep. 17, 2014.

BACKGROUND OF THE INVENTION

1. Field of the Invention

The present invention relates to an information processing device, an information processing method, and a computer program product.

2. Description of the Related Art

Conventionally, there has been known systems for managing an action to be executed by a user (for example, Japanese Patent Application Laid-open No. 2003-345966 and Japanese Patent Application Laid-open No. 2013-88829). For example, when some kind of event to be immediately dealt with has occurred, such systems can present to a user an action to be executed on the event that has occurred.

However, presenting only contents of an action to be executed cannot make a user know whether the action needs to be executed urgently or does not need to be executed urgently.

Therefore, there is a need for an information processing device, an information processing method, and a computer program product that are capable of presenting a task that indicates an action to be executed upon occurrence of an event and a target completion time of the task to a user.

SUMMARY OF THE INVENTION

It is an object of the present invention to at least partially solve the problems in the conventional technology.

According to an embodiment, an information processing device includes an event detector, a task generator, a target time setting unit, and a presenting unit. The event detector detects occurrence of an event. The task generator generates at least one task indicating an action to be executed when the detected event occurs. The target time setting unit sets, for each of the tasks corresponding to the detected event, a target completion time of the task until when a state change generated due to occurrence of the event does not exceed a threshold, on the basis of an execution result of tasks corresponding to a past event related to the detected event. The presenting unit presents each of the tasks corresponding to the detected event and the target completion time of each of the tasks to a user.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram illustrating a block diagram of an information processing device;

FIG. 3 is a table illustrating an example of event data;

FIG. 4 is a table illustrating an example of a log of past events;

DETAILED DESCRIPTION OF THE PREFERRED EMBODIMENTS

An exemplary embodiment of a task management system 10 according to the present invention will be described in detail below with reference to the accompanying drawings. The task management system 10 according to the embodiment aims to present a task that indicates an action to be executed upon occurrence of an event and a target completion time of the task to a user.

Figure 1:
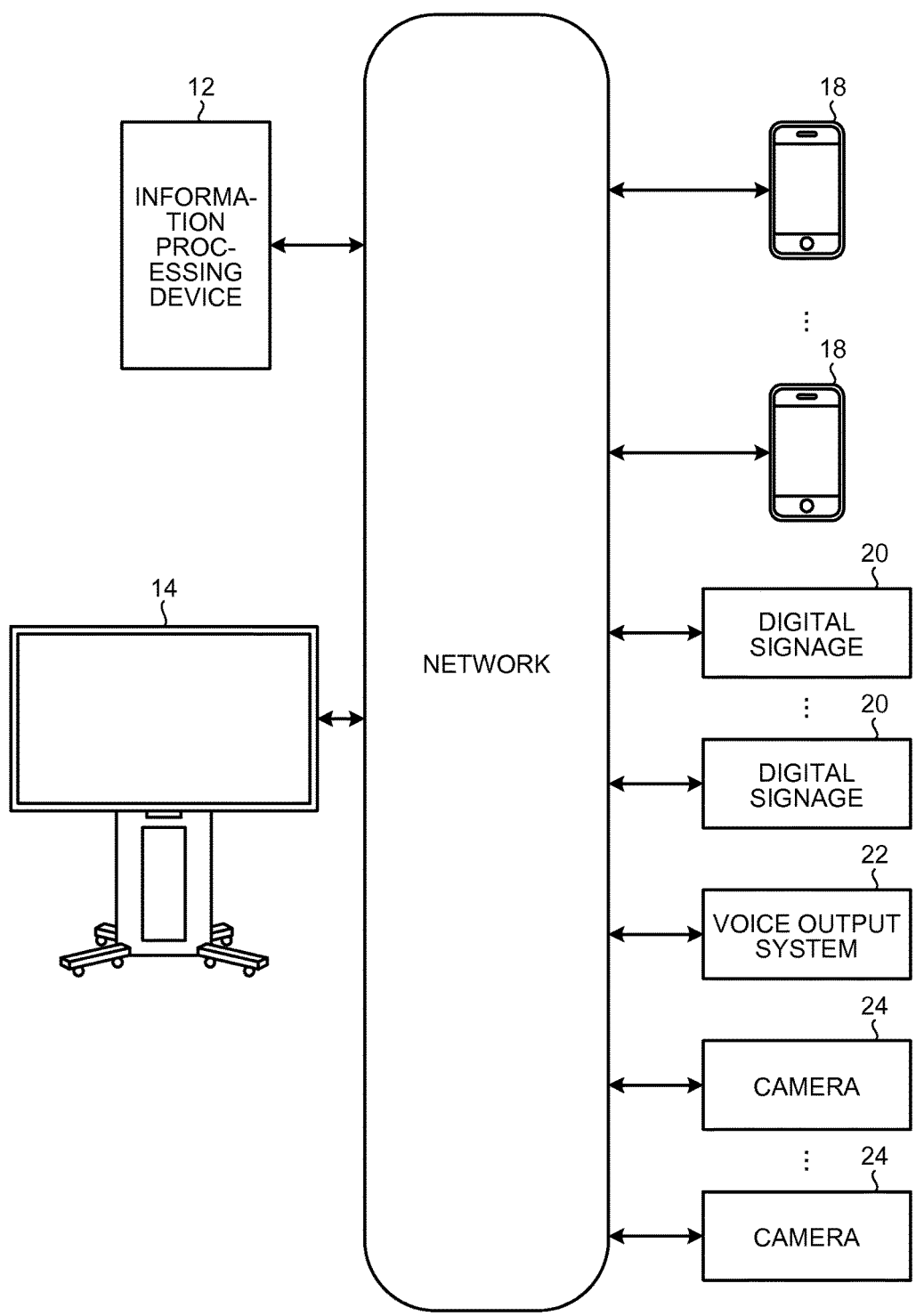
FIG. 1 is a diagram illustrating an example of a task management system according to an embodiment of the present invention.

FIG. 1 is a diagram illustrating an example of the task management system 10 according to the embodiment. The task management system 10, as an example, manages an action to be executed by a site worker and the like at transport facilities. Examples to which the task management system 10 can be applied are not limited to this example.

The task management system 10 includes an information processing device 12, an electronic blackboard 14, a plurality of terminal devices 18, a plurality of sets of digital signage 20, a voice output system 22, and a plurality of cameras 24. These are connected to each other via a network.

The information processing device 12 is a computer managed by a user that operates the task management system 10. The information processing device 12 executes a computer program for task management, and controls the electronic blackboard 14, the terminal devices 18, the digital signage 20, the voice output system 22, and the cameras 24.

The electronic blackboard 14 is a device for inputting and outputting information corresponding to user's operation on a screen using an electronic pen, user's hand or the like. In order to input information, a user can draw characters or figures on the electronic blackboard 14 in the same manner as the user draws characters or figures on a wall using a pen. The electronic blackboard 14 can display information similarly to a display.

The electronic blackboard 14 functions as an input/output device of the information processing device 12. The electronic blackboard 14 may be directly connected to the information processing device 12 via no network. The information processing device 12 may be integrated with the electronic blackboard 14. The task management system 10 may include a display and an input device connected to the information processing device 12 in place of the electronic blackboard 14.

The terminal devices 18 are carried and held by users. In the example, the terminal devices 18 are carried and held by site workers and the like serving customers. The terminal devices 18 are devices having an input function, an output function (for example, display function), and a communication function of data. Examples of the terminal devices 18 include portable terminals such as smartphones, tablets, and portable phones.

The digital signage 20 refers to electronic signboards for providing information in images or characters to customers. In the example, the digital signage 20 refers to devices for displaying information to customers that use transport facilities. The digital signage 20 displays information corresponding to operation made by site workers and the like that serve customers.

The voice output system 22 is a device for providing information by voice to customers. In the example, the voice output system 22 is a device for notifying customers that use transport facilities of information. The voice output system 22 outputs voice corresponding to operation made by site workers and the like.

The cameras 24 are imaging devices for imaging the surrounding situations. In the example, the cameras 24 image platforms and the like so as to detect the congestion degree of customers that use a station.

FIG. 2 is a diagram illustrating a block diagram of the information processing device 12. The information processing device 12 executes a previously installed computer program and cooperates as needed with a hardware resource so as to achieve functions of each block illustrated in FIG. 2.

The information processing device 12 includes an event detector 31, an event data storage unit 32, a task generator 33, a log storage unit 34, a log acquiring unit 35, a target time setting unit 36, a presenting unit 37, an execution managing unit 38, an instructing unit 39, a completion accepting unit 40, a warning unit 41, a state change acquiring unit 42, and a log generator 43.

The event detector 31 detects occurrence of an event. An event generates at least one task that indicates an action to be executed by a user. In the example, events include interruption in operation of transport facilities of a user's company, and delay in transport facilities of other companies. If the information processing device 12 is applied to a maintenance and management system of a network, an event may be network failure or the like.

The event detector 31 may detect, as occurrence of an event, inputting by the user of information indicating occurrence of an event. The event detector 31 may detect occurrence of an event by receiving an e-mail or predetermined information from another system.

The event data storage unit 32 stores therein at least one task that indicates an action to be executed upon occurrence of an event for each event. As an example, as illustrated in FIG. 3, the event data storage unit 32 stores therein tasks such as notification of an initial report, notification of an alternative route, notification of details, notification of a restart schedule, and notification of the restart, about an event of interruption in operation of transport facilities.

The notification of an initial report is a task for displaying information that the operation of transport facilities has been interrupted to customers that use the transport facilities or notifying the customers of the information by voice. The notification of an alternative route is a task for displaying an alternative route to customers that use transport facilities or notifying the customers of the alternative route by voice. The notification of details is a task for displaying a detailed cause of interruption in operation to customers that use transport facilities or notifying the customers of the detailed cause by voice. The notification of a restart schedule is a task for displaying a scheduled time for restarting operation to customers or notifying the customers of the scheduled time by voice. The notification of a restart is a task for displaying information that the operation of transport facilities has been restarted to customers that use transport facilities or notifying the customers of the restart information by voice.

The task generator 33 generates at least one task indicating an action to be executed when an event detected by the event detector 31 occurs. In the embodiment, the task generator 33 reads and acquires a task corresponding to the detected event from the event data storage unit 32. The task generator 33 transfers the generated task to the log acquiring unit 35, the presenting unit 37, and the execution managing unit 38.

The log storage unit 34 stores therein a completion period of each task and state change information at the completion of the task, in association with the events that have occurred in the past. In the embodiment, the log storage unit 34 stores therein an event, an occurrence time, tasks, a completion period of each task, and state change information at the completion of each task in association with each other as illustrated in FIG. 4.

A completion period is a period between when an event occurs and when the corresponding task is completed.

The state change information is information representing a state change generated due to the occurrence of an event. For example, the state change information may be information representing the number of inquiries from customers due to occurrence of an event, the congestion degree of customers due to an event, or the like. The log storage unit 34 may store therein a plurality of kinds of state change information corresponding to one task.

The log acquiring unit 35 refers to the log storage unit 34, and specifies a past event related to an event detected by the event detector 31. The log acquiring unit 35 acquires a completion period of each task in the specified event and state change information at the completion thereof, and transfers the acquired completion period and state change information to the target time setting unit 36.

As an example, when an event of interruption in operation of transport facilities occurs, the log acquiring unit 35 acquires the completion period of a task and state change information at the completion thereof, about an event of interruption in operation of transport facilities that has occurred in the past from the log storage unit 34. In this case, the log acquiring unit 35 may narrow down an event by a day of week, a time zone or the like when the event has occurred. For example, when an event occurs in the morning on weekdays, the log acquiring unit 35 may narrow down to, out of the identical events having occurred in the past, the event having occurred in the morning on weekdays.

The target time setting unit 36 sets, for respective tasks corresponding to a detected event, target completion times until when corresponding state changes generated due to occurrence of the event do not exceed thresholds, on the basis of the execution results of the tasks in the past event related to the detected event. More specifically, the target time setting unit 36 calculates, for respective tasks corresponding to a detected event, target completion times on the basis of completion periods for the identical tasks in the past event related to the detected event and on the basis of state change information representing state changes observed at the completion of the identical tasks. An example of a specific method for calculating each target completion time will be described later with reference to FIG. 6.

The target time setting unit 36 transfers the target completion time set for each of the tasks to the presenting unit 37 and the execution managing unit 38.

Figure 5:
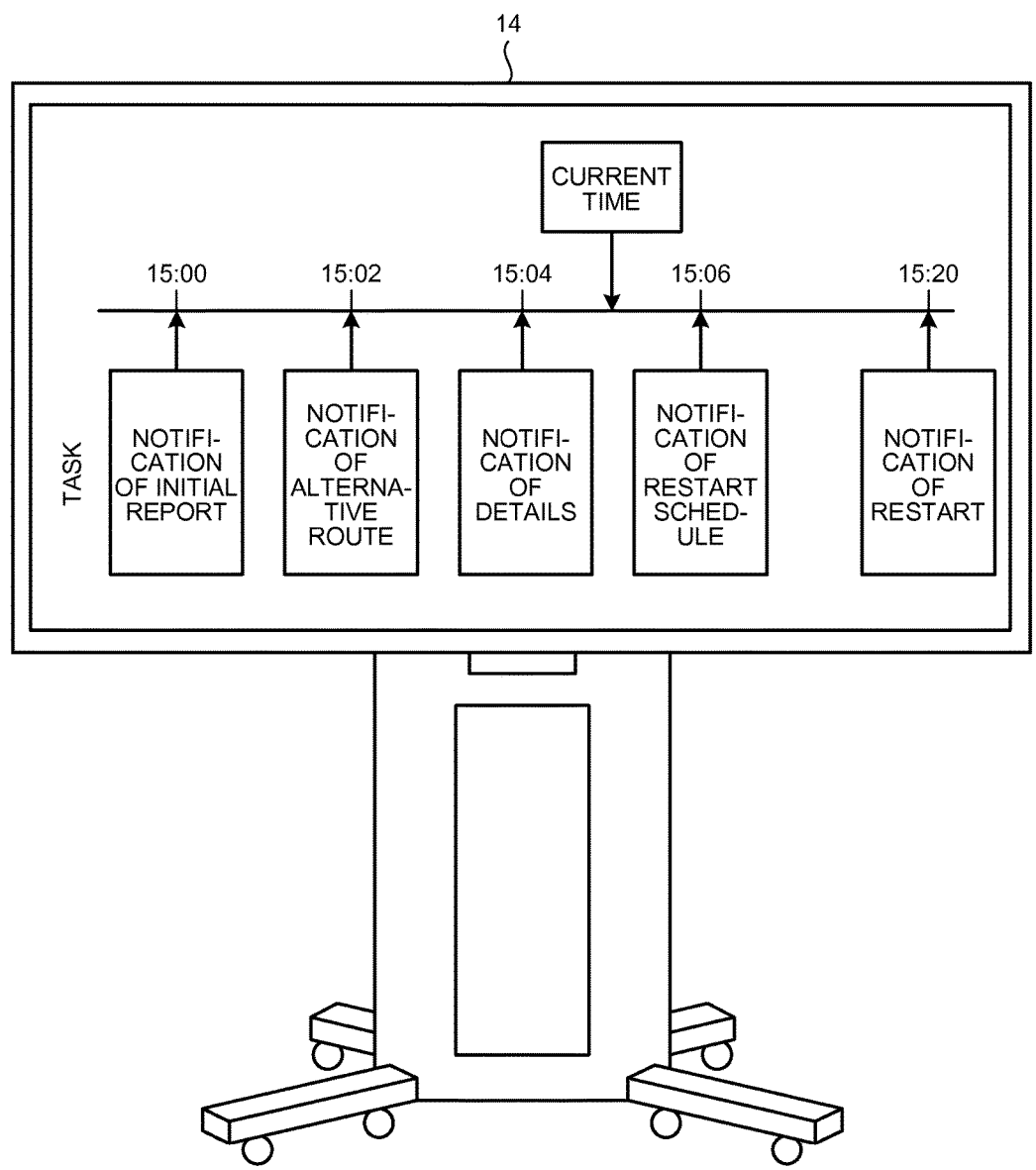
FIG. 5 is a view illustrating an example of displaying tasks.

The presenting unit 37 presents each of the tasks corresponding to the detected event and the target completion time of each of the tasks to a user. In the example, the presenting unit 37 displays each of the tasks corresponding to the detected event and the target completion time of each of the tasks on the electronic blackboard 14 as illustrated in FIG. 5. In this manner, the presenting unit 37 can display a task and a target completion time together on the electronic blackboard 14 on which an action against an event and a review result are posted.

The presenting unit 37 may display each of the tasks corresponding to the detected event with a target completion time in a time series manner as illustrated in FIG. 5. In this manner, the presenting unit 37 enables a user to grasp an order of the tasks to be executed. The presenting unit 37 may display a mark or the like indicating the current time together on the time axis of tasks aligned in a time series manner. In this manner, the presenting unit 37 enables a user to grasp a time relation between the current time and a target completion time of a task.

The presenting unit 37 may transmit each of the tasks and the target completion time to the terminal devices 18 and cause the terminal devices 18 to display them on the screen. In this manner, the presenting unit 37 can notify site workers and the like of a task to be executed and a target completion time.

The execution managing unit 38 manages an execution state of each of the tasks corresponding to a detected event. As an example, the execution managing unit 38 manages an execution order and an execution start timing of each of the tasks. The execution managing unit 38 may manage a person in charge of executing each of the tasks. The execution managing unit 38 manages whether each of the tasks is completed.

The instructing unit 39 transmits an execution start instruction of each of the tasks to the terminal devices 18 at the timing of starting execution of the task, under the control of the execution managing unit 38. As an example, if a person in charge of a task has already been designated, the instructing unit 39 may transmit an execution start instruction to the terminal device 18 held by the person in charge of the task.

The completion accepting unit 40 receives completion-reporting information on execution of each of the tasks. A user having executed a task operates, when execution of the corresponding task is completed, the terminal device 18 to transmit the completion-reporting information. When receiving the completion-reporting information from any of the terminal devices 18, the completion accepting unit 40 notifies the execution managing unit 38 of the reception of the completion-reporting information. When the completion accepting unit 40 receives the completion-reporting information, the execution managing unit 38 determines that the corresponding task is completed.

If the corresponding task is not completed even when the current time reaches a target completion time, the warning unit 41 warns a user that the corresponding task is not completed. As an example, the warning unit 41 may display warning information on the electronic blackboard 14 and the terminal devices 18 and may notify a user of a warning by voice.

The state change acquiring unit 42 detects a state change due to occurrence of an event. The state change acquiring unit 42 generates state change information representing the detected state change.

As an example, the state change acquiring unit 42 detects the number of inquiries from customers as a state change to generate the state change information. For example, when site worker receives an inquiry from and serves a customer, the site worker is supposed to push a button or the like displayed on the terminal device 18. The state change acquiring unit 42 may detect the number of inquiries from customers by counting the number of times the button has been pushed by the site worker or the like.

As an example, the state change acquiring unit 42 detects the congestion degree of customers as a state change to generate the state change information. For example, the state change acquiring unit 42 may calculate the congestion degree by counting the number of customers on the basis of images imaged by the cameras 24.

Upon completion of each of the tasks, the log generator 43 acquires the state change information generated by the state change acquiring unit 42. The log generator 43 calculates, for each task, a completion period indicating a period from a start time of an event to a completion time of the task. The log generator 43 writes a combination of a completion period of a task and state change information at the completion of the task, in association with a corresponding event, into the log storage unit 34. In this manner, the log storage unit 34 can store therein the information illustrated in FIG. 4.

Figure 6:
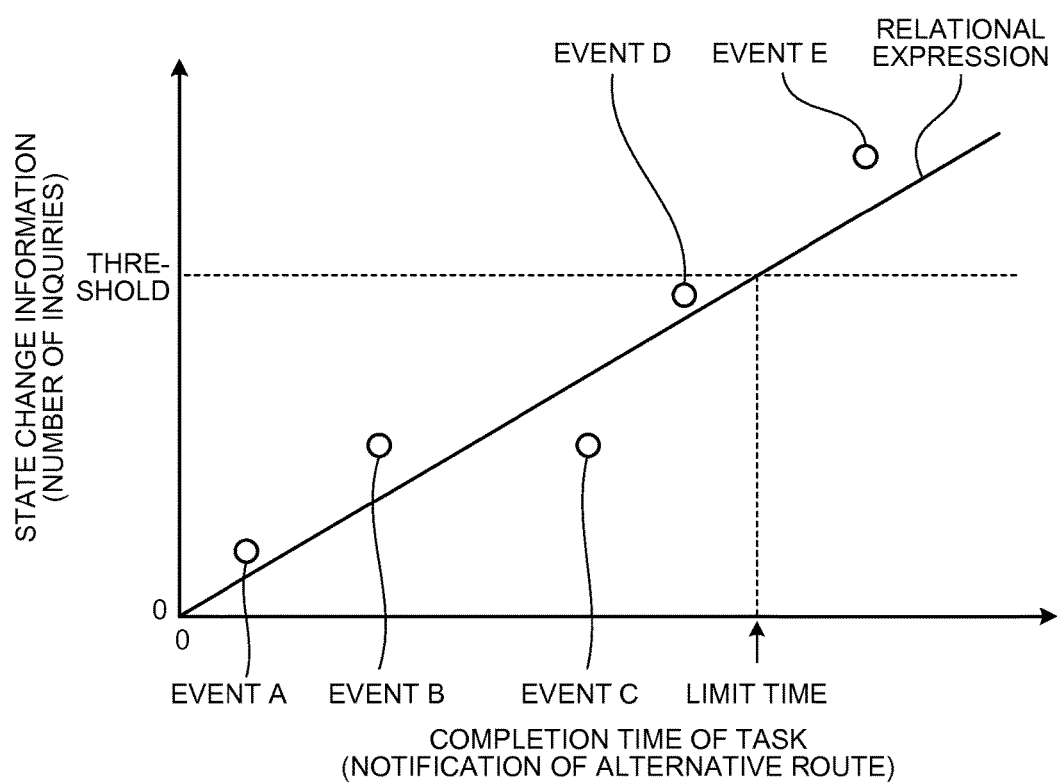
FIG. 6 is a diagram illustrating a graph that represents a relational expression between the completion period of tasks corresponding to the past events and state change information (the number of inquiries)

FIG. 6 is a diagram illustrating a graph that represents a relational expression between the completion period of tasks corresponding to the past events and state change information (the number of inquiries). For each of the tasks corresponding to a detected event, the target time setting unit 36 acquires a completion period of the identical task in the past event related to the detected event, and state change information at the completion thereof.

For example, the target time setting unit 36 acquires a completion period of each of the past tasks identical to a task (for example, a notification task of an alternative route) and state change information at the completion thereof (for example, the number of inquires). The target time setting unit 36 obtains a relational expression representing a relation of state change information at the completion with completion periods, from the acquired information. In the example, the target time setting unit 36 obtains a relational expression where a relation of state change information at the completion with completion periods is approximated by a linear function as illustrated in FIG. 6.

The target time setting unit 36 calculates, from the calculated relational expression, a limit period at the end of which the state change information coincides with a predetermined threshold. The threshold is set to a value at or under which a state change generated due to an event does not exceed, for example, a limit value that cannot be handled by a user. For example, the threshold is set to, for example, a value of 70% of a maximum number of inquiries that can be handled by site workers, or a value of 80% of a maximum congestion degree where customers can at least move.

The target time setting unit 36 calculates a target completion time for a task (for example, a notification task of an alternative route) from the calculated limit time and an occurrence time of an event. For example, the target time setting unit 36 adds a limit time to an occurrence time of an event so as to calculate a target completion time. In this manner, the target time setting unit 36 can calculate target completion times for respective tasks corresponding to a detected event.

Figure 7:
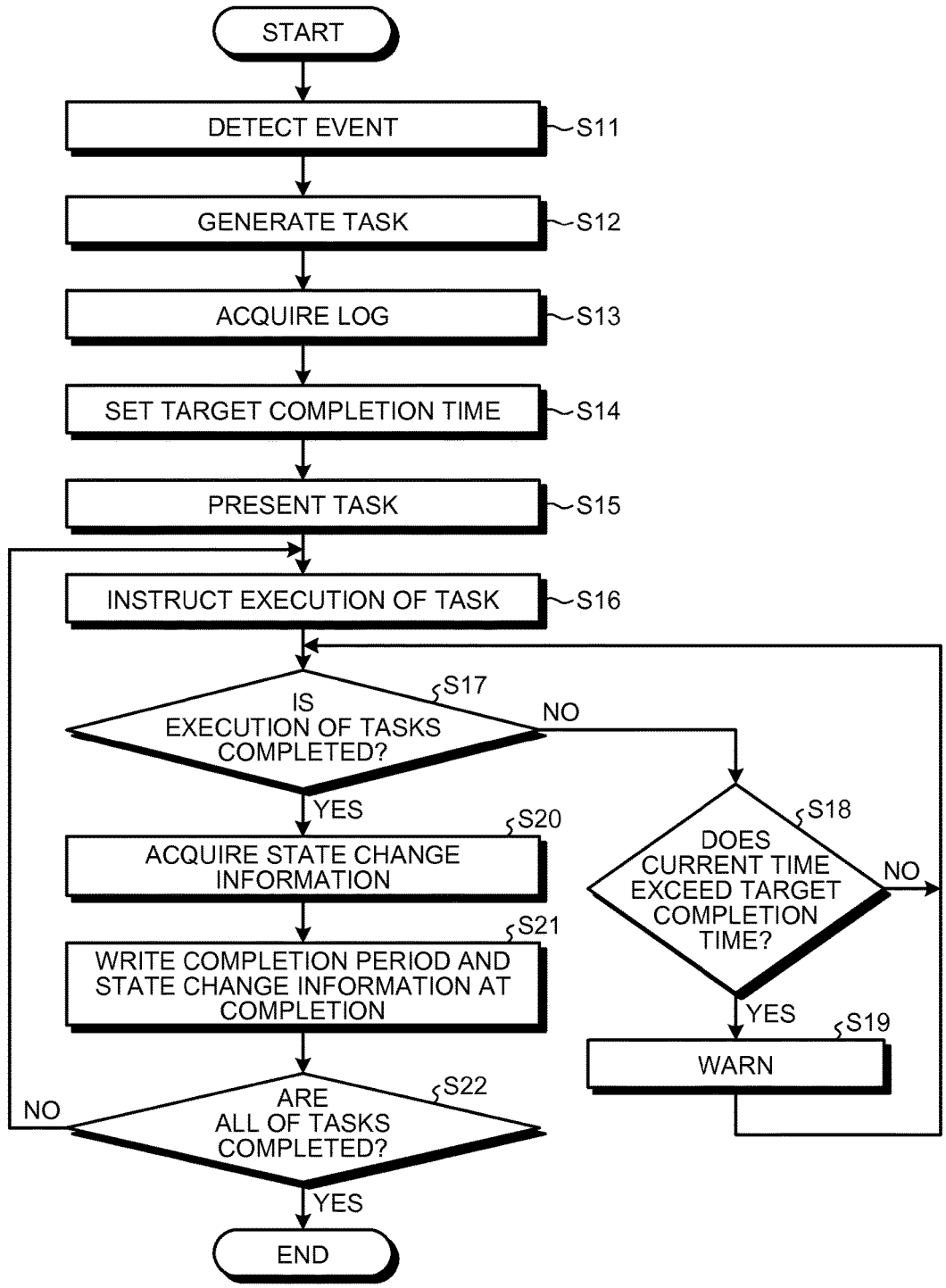
FIG. 7 is a flowchart illustrating a processing procedure of the information processing device.

FIG. 7 is a flowchart illustrating a processing procedure of the information processing device 12. When any event occurs, the information processing device 12 executes processing according to a flow illustrated in FIG. 7.

The information processing device 12 detects an event at Step S11. Subsequently, at Step S12, the information processing device 12 generates at least one task indicating an action to be executed when the detected event occurs.

The information processing device 12 specifies a log of a past event related to the detected event at Step S13. The information processing device 12 acquires completion periods of respective tasks in the log of the specified past event and state change information at the completion of the tasks.

The information processing device 12 sets a target completion time of each of the tasks corresponding to the detected event on the basis of the execution result of the task in the past event related to the detected event at Step S14. The information processing device 12 presents each of the tasks corresponding to the detected event and a target completion time of each of the tasks to a user at Step S15. As an example, the information processing device 12 displays each of the tasks corresponding to the detected event and a target completion time of each of the tasks on the electronic blackboard 14 in a time series manner.

The information processing device 12 sequentially issues instructions for execution of the tasks at Step S16. In this case, if the order of executing the tasks or the timing of starting the execution is set, the information processing device 12 issues instructions for execution of the tasks according to the setting.

The information processing device 12 determines whether execution of the tasks is completed at Step S17. If not (No at Step S17), the information processing device 12 advances the process to Step S18. The information processing device 12 determines whether the current time exceeds a target completion time of any of the uncompleted tasks at Step S18. If the current time exceeds the target completion time (Yes at Step S18), the information processing device 12 warns a user at Step S19 and returns the process to Step S17. If not (No at Step S18), the information processing device 12 returns the process directly to Step S17.

The information processing device 12 repeats loop processing from Step S17 to Step S19, and advances the process to Step S20 when execution of the tasks is completed (Yes at Step S17). The information processing device 12 acquires state change information at the completion of the tasks at Step S20. The information processing device 12 writes, for each of the completed tasks, a completion time thereof and the state change information at the completion thereof into the log storage unit 34 at Step S21.

The information processing device 12 determines whether the execution of all of the tasks is completed at Step S22. If not (No at Step S22), the information processing device 12 returns the process to Step S16 and repeats processing from Step S16 for a next task. If the execution of all of the tasks is completed (Yes at Step S22), the information processing device 12 exits from this procedure and ends the processing.

As described above, the task management system 10 in accordance with the embodiment can present a task indicating an action to be executed upon occurrence of an event and a target completion time of the task to a user. In this manner, the task management system 10 can manage a completion time of a task so that a state change due to occurrence of an event may not exceed a threshold. In addition, the task management system 10 warns a user when the current time exceeds a target completion time. In this manner, the task management system 10 can notify a user that a state change is likely to exceed a threshold.

Figure 8:
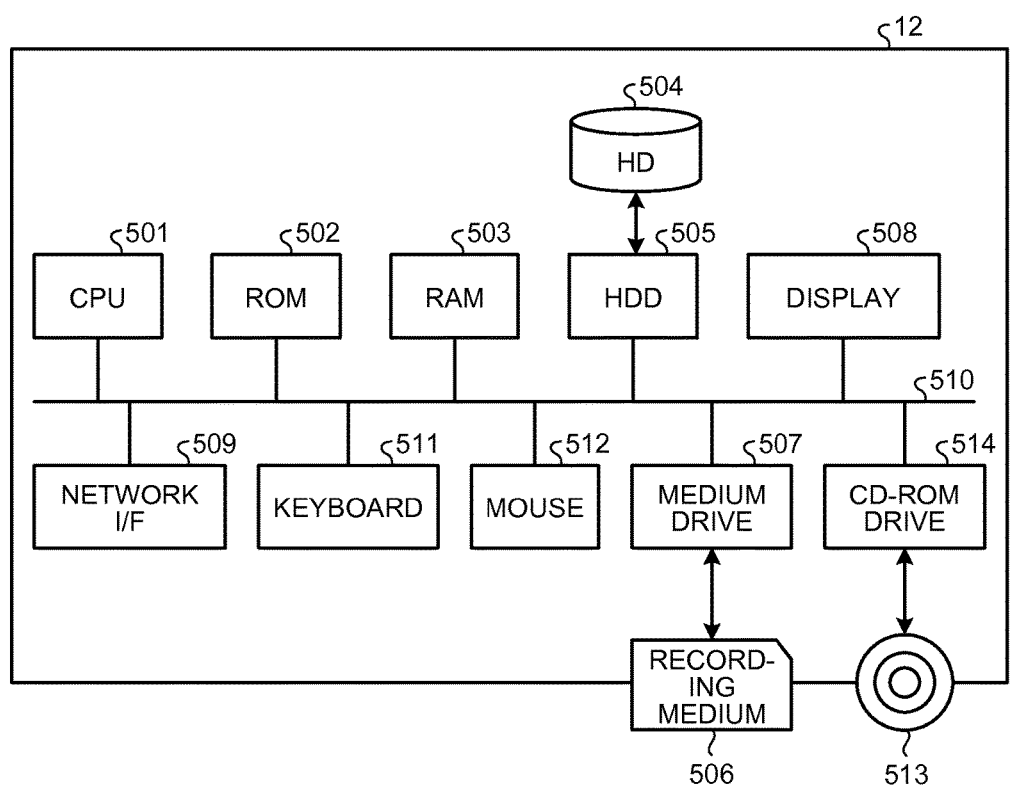
FIG. 8 is a diagram illustrating an example of a hardware configuration of the information processing device.

FIG. 8 is a diagram illustrating an example of a hardware configuration of the information processing device 12. The information processing device 12 has the same hardware configuration as that of a typical computer, and includes, for example, a central processing unit (CPU) 501, read-only memory (ROM) 502, random-access memory (RAM) 503, a hard disk (HD) 504, a hard disk drive (HDD) 505, a medium drive 507, a display 508, a network interface (I/F) 509, a bus line 510, a keyboard 511, a mouse 512, and a compact disc read-only memory (CD-ROM) drive 514.

The CPU 501 controls the entire operation of the information processing device 12. The ROM 502 stores therein a computer program to be used for driving the CPU 501. The RAM 503 is used as a work area for the CPU 501. The HD 504 stores therein various kinds of data such as a computer program for the information processing device 12. The HDD 505 controls various kinds of data to be read from or written into the HD 504 under the control of the CPU 501. The medium drive 507 controls reading or writing (storing) of data from or to a removable recording medium 506 such as a flash memory. The display 508 displays various kinds of information such as a cursor, a menu, a window, characters, and an image. The network I/F 509 controls communication that is performed via a network.

The keyboard 511 includes a plurality of keys for inputting characters, numerical values, and various kinds of instructions. The mouse 512 is used for selecting and executing various kinds of instructions, selecting an object to be processed, moving a cursor and the like. The CD-ROM drive 514 controls various kinds of data to be read from or written into compact disc read-only memory (CD-ROM) 513 as an example of a removable recording medium. Examples of the bus line 510 include an address bus for connecting between components and a data bus.

FIG. 8 illustrates a hardware configuration in the case where the information processing device 12 is formed by one computer, but the information processing device 12 may be formed by a plurality of computers connected to each other via a network and the like and operating in cooperation.

A computer program executed by the information processing device 12 in the embodiment has a modular composition that includes an event detecting module, a task generating module, a log acquiring module, a target time setting module, a presenting module, an execution managing module, an instructing module, a completion accepting module, a warning module, a state change acquiring module, and a log generating module. This computer program is loaded on the RAM 503 and executed by the CPU 501 (processor). This processing causes a computer to function as the event detector 31, the task generator 33, the log acquiring unit 35, the target time setting unit 36, the presenting unit 37, the execution managing unit 38, the instructing unit 39, the completion accepting unit 40, the warning unit 41, the state change acquiring unit 42, and the log generator 43. This computer program also causes the HD 504 or the recording medium 506 to function as the event data storage unit 32 and the log storage unit 34.

The configuration of the information processing device 12 is not limited to this configuration, and may be the configuration where at least a part of the event detector 31, the task generator 33, the log acquiring unit 35, the target time setting unit 36, the presenting unit 37, the execution managing unit 38, the instructing unit 39, the completion accepting unit 40, the warning unit 41, the state change acquiring unit 42, and the log generator 43 is implemented using a hardware circuit (for example, a semiconductor integrated circuit).

The computer program executed by the information processing device 12 in the embodiment is a file in a format installable in a computer or in an executable format, and is recorded and provided in a computer-readable recording media such as a CD-ROM, a flexible disk, a compact disc recordable (CD-R), and a digital versatile disc (DVD).

The computer program to be executed by the information processing device 12 in the embodiment may be stored in a computer connected to a network such as the Internet and be provided by being downloaded via the network. The computer program to be executed by the information processing device 12 in the embodiment may be provided or distributed via a network such as the Internet. The computer program to be executed by the information processing device 12 may be provided by being previously incorporated in a ROM and the like.

The present invention can present a task that indicates an action to be executed upon occurrence of an event and a target completion time of the task to a user.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
a processor configured to,
detect occurrence of an event,
generate at least one task indicating an action to be executed when the detected event occurs,
set a target completion time for each of the at least one task based on the detected occurrence of the event, an execution result of tasks corresponding to a past event related to the detected event, and a threshold value, the threshold value corresponding to a state change, and the threshold value being a percentage of a maximum value, and
present each of the tasks corresponding to the detected event and the target completion time of each of the tasks to a user.

2. The information processing device according to claim 1, wherein the processor is configured to
set the target completion time for each of the tasks based on a completion period of an identical task corresponding to a past event related to the detected occurrence of the event, and
generate state change information representing a previous state change observed at the completion of the identical task.

3. The information processing device according to claim 2, wherein the processor is configured to
manage an execution state of each of the tasks corresponding to the detected occurrence of the event, and
warn a user if the corresponding task is not completed even when a current time reaches the target completion time.

4. The information processing device according to claim 2, wherein the processor is configured to
detect a number of inquiries from customers as the state change, and
generate state change information indicating the detected number of inquiries,
wherein the threshold value is a desired limit to the number of inquiries from the customers before the task is completed, and the maximum value is a maximum number of inquiries that can be handled.

5. The information processing device according to claim 2, wherein the processor is configured to
detect a congestion degree of customers as the state change and generate state change information indicating the detected congestion degree,
wherein the threshold value is a desired limit to the congestion degree before the task is completed, and the maximum value is a maximum congestion degree.

6. The information processing device according to claim 1, wherein the processor is configured to transmit to a display the tasks corresponding to the detected event in a time series manner along with the target completion times.

7. An information processing method comprising:
detecting occurrence of an event;
generating at least one task that indicates an action to be executed when the detected event occurs;
setting, for each of the tasks corresponding to the detected event, a target completion time of the task based on the detected occurrence of the event, an execution result of tasks corresponding to a past event related to the detected event, and a threshold value, the threshold value corresponding to a state change, and the threshold value being a percentage of a maximum value; and
presenting each of the tasks corresponding to the detected event and the target completion time of each of the tasks to a user.

8. The information processing method according to claim 7, wherein the setting includes calculating, for each of the tasks corresponding to the detected event, the target completion time on the basis of a completion period of an identical task corresponding to a past event related to the detected event and state change information representing a previous state change observed at the completion of the identical task.

9. The information processing method according to claim 8, further comprising:

managing an execution state of each of the tasks corresponding to the detected event; and warning a user if the corresponding task is not completed, if a current time reaches the target completion time.

10. The information processing method according to claim 8, further comprising:

detecting number of inquiries from customers as the state change; and generating state change information indicating the detected number of inquiries, wherein the threshold value is a desired limit to the number of inquiries from the customers before the task is completed, and the maximum value is a maximum number of inquiries that can be handled.

11. The information processing method according to claim 8, further comprising:

detecting a congestion degree of customers as the state change; and generating state change information indicating the detected congestion degree, wherein the threshold value is a desired limit to the congestion degree before the task is completed, and the maximum value is a maximum congestion degree.

12. The information processing device according to claim 7, wherein the presenting includes displaying the tasks corresponding to the detected event in a time series manner along with the target completion times.

13. A non-transitory computer-readable medium containing computer readable instructions, the instructions when executed by a processor causes the processor to:

detect occurrence of an event;

generate at least one task that indicates an action to be executed when the detected event occurs;

set, for each of the tasks corresponding to the detected event, a target completion time of the task based on the detected occurrence of the event, an execution result of tasks corresponding to a past event related to the detected event, and a threshold value, the threshold value corresponding to a state change, and the threshold value being a percentage of a maximum value; and present each of the tasks corresponding to the detected event and the target completion time of each of the tasks to a user.

* * * * *